(12) United States Patent
Gill

(10) Patent No.: US 6,624,986 B2
(45) Date of Patent: Sep. 23, 2003

(54) FREE LAYER STRUCTURE FOR A SPIN VALVE SENSOR WITH A SPECULAR REFLECTING LAYER COMPOSED OF FERROMAGNETIC OXIDE

(75) Inventor: Hardayal Singh Gill, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 93 days.

(21) Appl. No.: 09/803,479

(22) Filed: Mar. 8, 2001

(65) Prior Publication Data
US 2002/0126428 A1 Sep. 12, 2002

(51) Int. Cl.[7] ................................. G11B 5/33
(52) U.S. Cl. ................................. 360/324.12
(58) Field of Search ............... 360/324.1, 324.12, 360/314, 316

(56) References Cited

U.S. PATENT DOCUMENTS

| | | | | |
|---|---|---|---|---|
| 5,287,238 A | * | 2/1994 | Baumgart et al. | 360/314 |
| 5,648,885 A | | 7/1997 | Nishioka et al. | 360/113 |
| 5,764,446 A | * | 6/1998 | Seagle | 360/121 |
| 5,849,422 A | | 12/1998 | Hayashi | 428/611 |
| 5,852,533 A | * | 12/1998 | Miyauchi et al. | 360/324.1 |
| 5,869,963 A | * | 2/1999 | Saito et al. | 324/252 |
| 6,134,090 A | * | 10/2000 | Mao et al. | 360/324.1 |
| 6,303,218 B1 | * | 10/2001 | Kamiguchi et al. | 428/332 |
| 6,473,278 B1 | * | 10/2002 | Gill | 360/324.12 |
| 2001/0004307 A1 | * | 6/2001 | Saito et al. | 360/324.12 |
| 2001/0014000 A1 | * | 8/2001 | Tanaka et al. | 360/324.12 |

FOREIGN PATENT DOCUMENTS

| | | | |
|---|---|---|---|
| JP | 1-91482 | 4/1989 | |
| JP | 9-54916 | 2/1997 | G11B/5/39 |
| JP | 10-294217 | 11/1998 | |

OTHER PUBLICATIONS

*IBM Technical Disclosure Bulletin*, vol. 40, No. 04, Apr. 1997, pp. 97–98 "Spin Valve Read Head with FeAl2O3/Fe/NiFe Tunneling Junction".
IEEE MAG—33, N. 5, pp. 2875ff, Sep. 1997.

* cited by examiner

Primary Examiner—William Korzuch
Assistant Examiner—Jennifer M. Dolan
(74) Attorney, Agent, or Firm—Ervin F. Johnson

(57) ABSTRACT

A free layer structure is provided for a spin valve sensor which has a nickel iron based layer and a ferromagnetic oxide layer wherein the cobalt iron oxide layer permits a thin nickel iron layer to be employed while maintaining a desired magnetic softness of the free layer structure and a desirable magnetoresistance of a spin valve sensor.

20 Claims, 13 Drawing Sheets

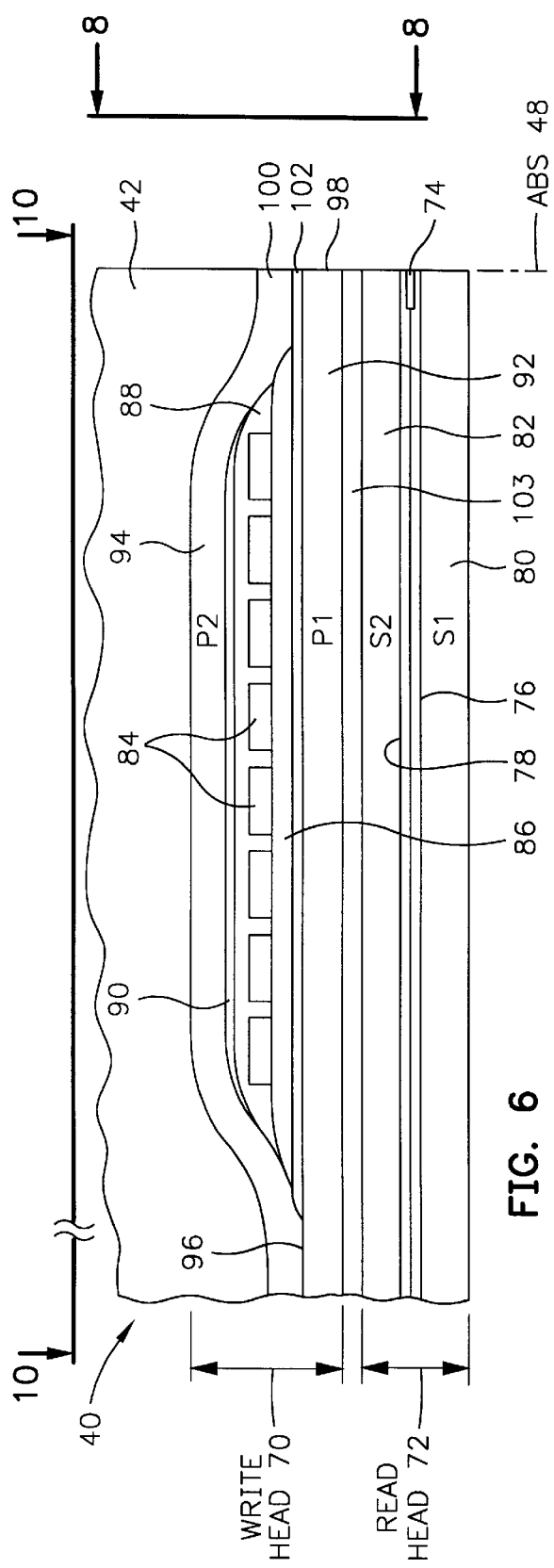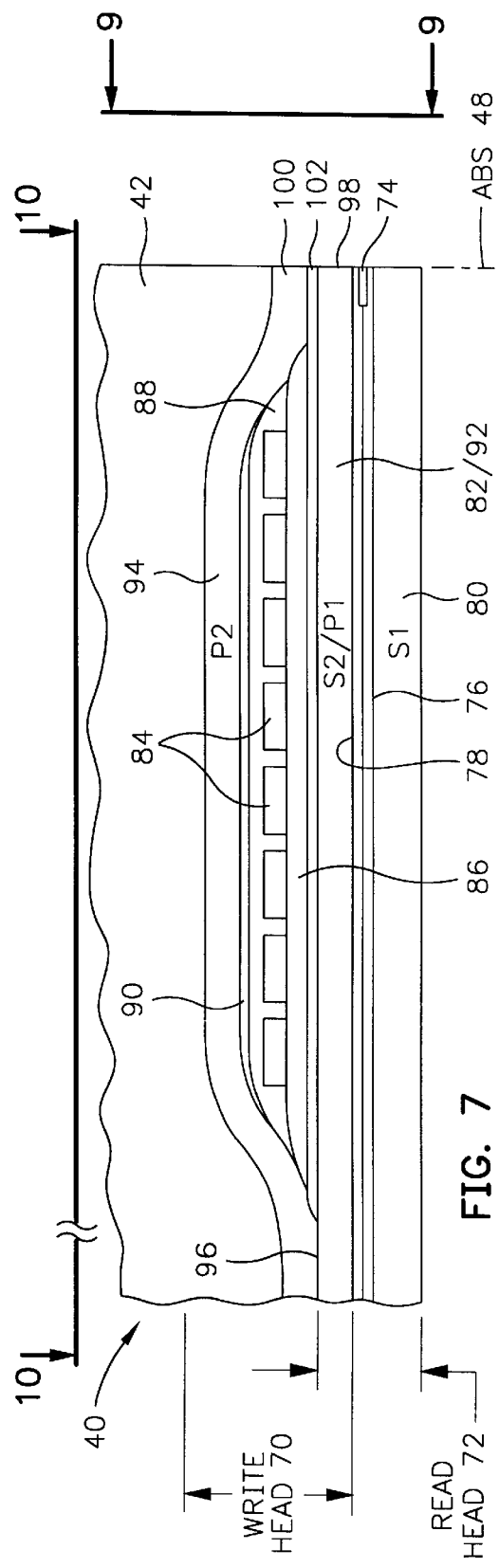

(ABS)

(BTM SV)

(BTM SV)

(BTM SV)

(TOP SV)

US 6,624,986 B2

FREE LAYER STRUCTURE FOR A SPIN VALVE SENSOR WITH A SPECULAR REFLECTING LAYER COMPOSED OF FERROMAGNETIC OXIDE

BACKGROUND OF THE INVENTION

1. Field of the Invention

The present invention relates to a free layer structure for a spin valve sensor with a specular reflecting layer composed of ferromagnetic oxide and, more particularly, to such a free layer structure which can be made thinner while maintaining a desirable magnetic softness and magnetoresistance.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is preferably parallel to the ABS, is the position of the magnetic moment of the free layer structure with the sense current conducted through the sensor in the absence of signal fields.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

The free layer structure typically employs a nickel iron layer which provides a desirable magnetic softness for the free layer. This means that the free layer has a low uniaxial anisotropy $H_K$ which promotes responsiveness of the free layer structure to signal fields from a rotating magnetic disk. When the free layer structure is highly responsive a small signal field will rotate the magnetic moment of the free layer structure which causes a change in the magnetoresistance of the spin valve sensor. It has been found that when the free layer structure also includes a cobalt iron or cobalt layer, sometimes referred to as a nanolayer, between the nickel iron layer and the spacer layer and interfacing the spacer layer that the magnetoresistance or magnetoresistive coefficient dr/R is improved. In order to obtain a desirable increase in the magnetoresistive coefficient dr/R, it has been further found that the thickness of the cobalt iron or cobalt layer should be on the order of 15 Å. Unfortunately, any increase in the thickness of the cobalt iron layer reduces the softness of the free layer structure so that it is not as responsive to signal fields from the rotating magnetic disk. Accordingly, an increase in the ratio of the thickness of the cobalt iron or cobalt layer to the thickness of the nickel iron layer increases the uniaxial anisotropy $H_K$ of the free layer structure and reduces its softness so that it is less responsive to signal fields. Further, the free layer structure is less stable in returning to a zero bias position and has been found to have increased magnetostriction. The only way known to overcome the increase in uniaxial anisotropy $H_K$ of the free layer structure, because of an increase in the thickness of the cobalt iron or cobalt nanolayer, is to increase the thickness of the nickel iron layer so as to reduce the above-mentioned ratio. Unfortunately, this reduces the sensitivity of the head by lowering the linear bit density of the read head which is the number of magnetic bits which can be read linearly along a track of a rotating magnetic disk.

SUMMARY OF THE INVENTION

The present invention overcomes the aforementioned problems by providing the free layer structure with a cobalt iron oxide layer or a nickel iron oxide layer which is located between the nickel iron layer and the cobalt iron or cobalt layer. Each of the ferromagnetic oxide and cobalt iron or cobalt layers can be 5 Å thick and the nickel iron layer can be made with a minimum thickness necessary for satisfying the requirements of the read head without magnetic saturation. Accordingly, the overall thickness of the free layer structure can be reduced in thickness while maintaining a desirable magnetic softness of the free layer structure. It is believed that the reason for this improvement is that the ferromagnetic oxide layer acts as a specular reflector of conduction electrons in the spin valve sensor so that scattering of the electrons is increased and that this increase in scattering equates to an increase in the magnetoresistive coefficient dr/R. While the preferred embodiment of the invention employs the aforementioned cobalt iron or cobalt layer, in another embodiment of the invention the free layer structure employs a ferromagnetic oxide layer between the nickel iron layer and the spacer layer and interfaces the spacer layer. The invention can be employed in either a top or a bottom spin valve sensor or a dual spin valve sensor. In a dual spin valve sensor the free layer structure may include the nickel iron layer sandwiched between first and second ferromagnetic oxide layers and in a further embodiment may include the nickel iron layer and the first and second ferromagnetic oxide layers sandwiched between first and second cobalt iron or cobalt layers with the first and second cobalt iron or cobalt layers interfacing first and second spacer layers respectively.

An object of the present invention is to increase the softness of a free layer structure when a cobalt iron or cobalt layer interfaces a spacer layer for increasing the magnetoresistive coefficient dr/R.

Another object is to eliminate a cobalt iron layer in a free layer structure and substitute a layer which maintains a high magnetoresistive coefficient dr/R while maintaining a softness of the overall free layer structure so that the free layer structure is highly responsive to signal fields.

A further object is to provide a free layer structure with a reduced thickness while maintaining a high magnetoresistive coefficient dr/R and low uniaxial anisotropy $H_K$.

Still another object is to provide a dual spin valve sensor with any of the aforementioned features set forth in the objects hereinabove.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
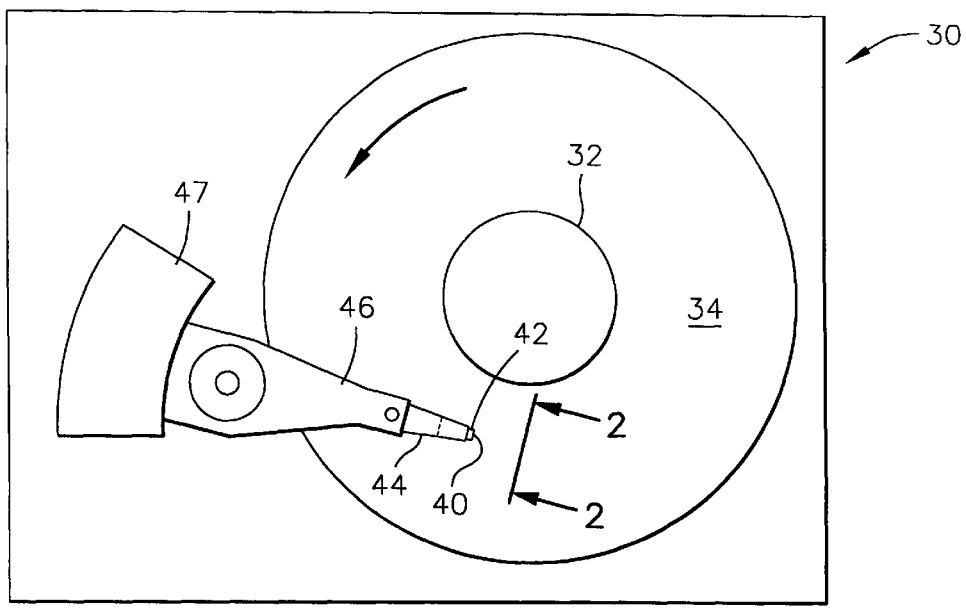
FIG. 1 is a plan view of a magnetic disk drive.
Figure 2:
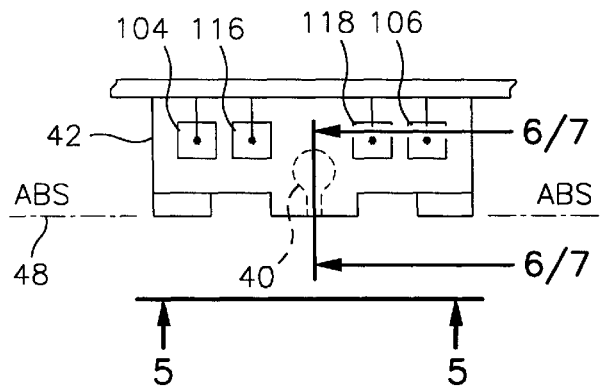
FIG. 2 is an end view of a slider with a magnetic head of the disk drive as seen in plane 2—2 of FIG. 1.
Figure 3:
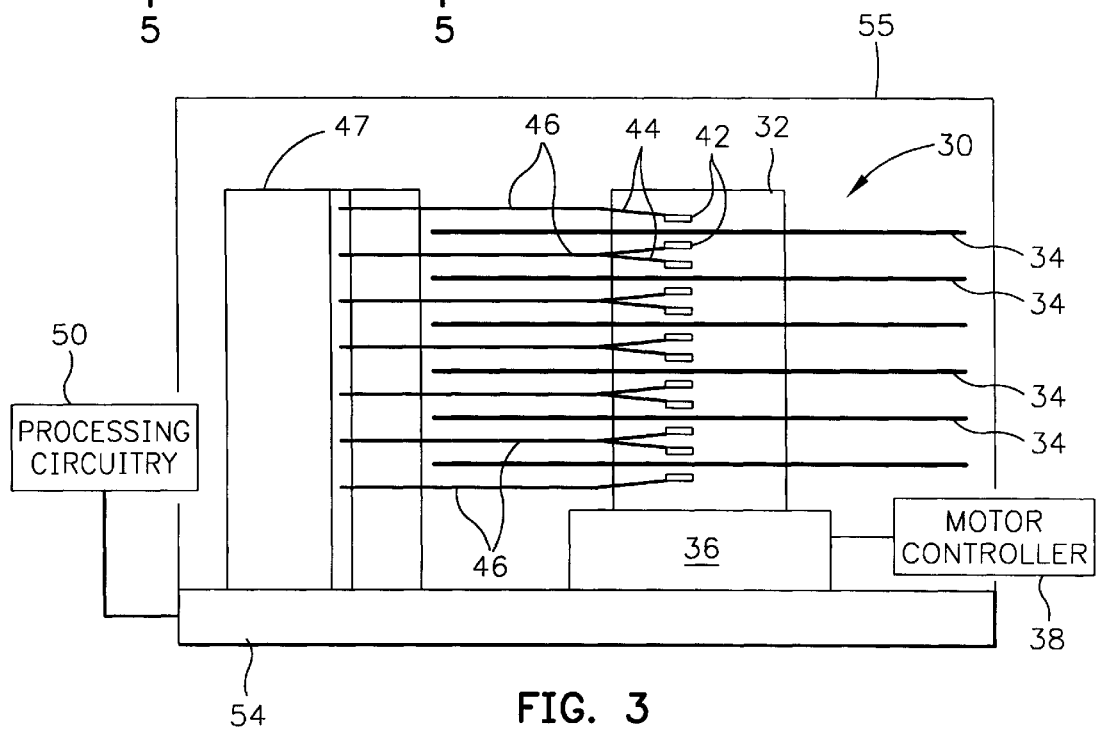
FIG. 3 is an elevation view of the magnetic disk drive wherein multiple disks and magnetic heads are employed.
Figure 4:
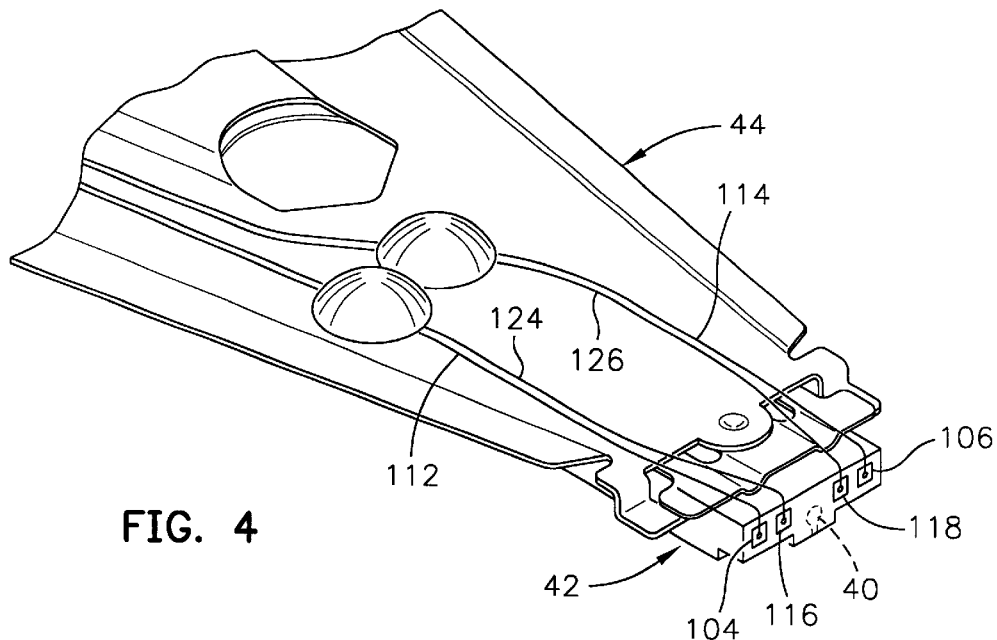
FIG. 4 is an isometric illustration of a suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air earing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
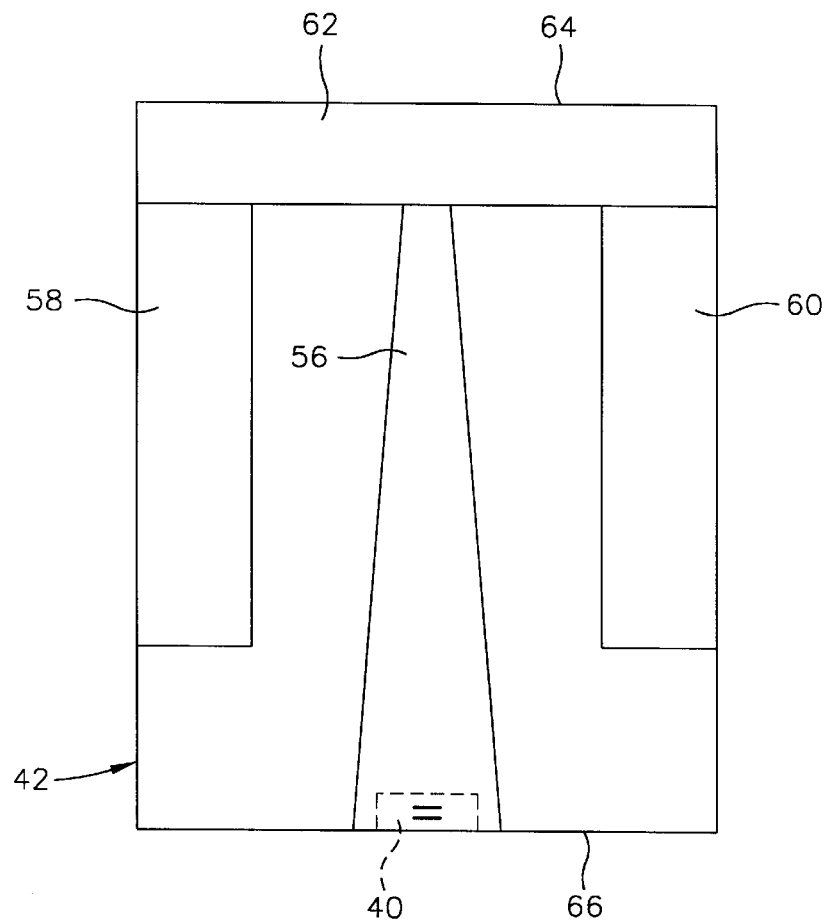
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
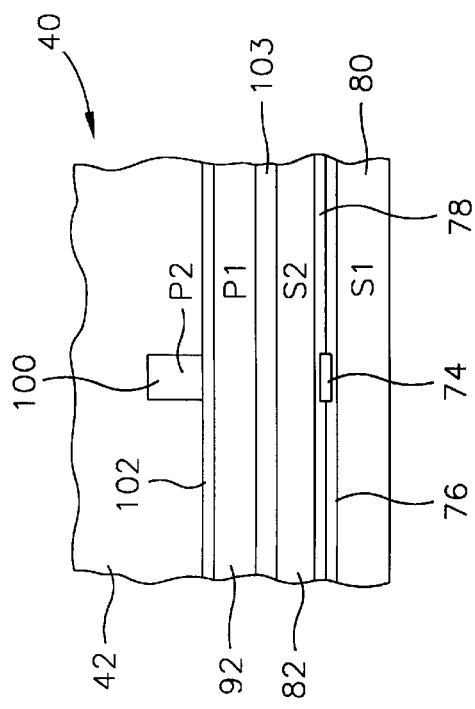
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a dual spin valve sensor 74 of the present invention. FIG. 8 is an ABS view of FIG. 6. The spin valve sensor 74 is sandwiched between nomnagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
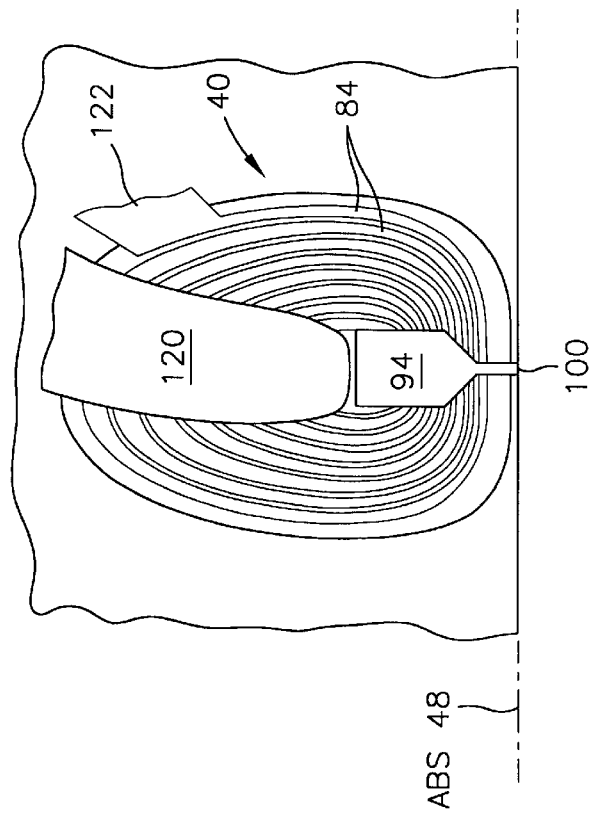
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
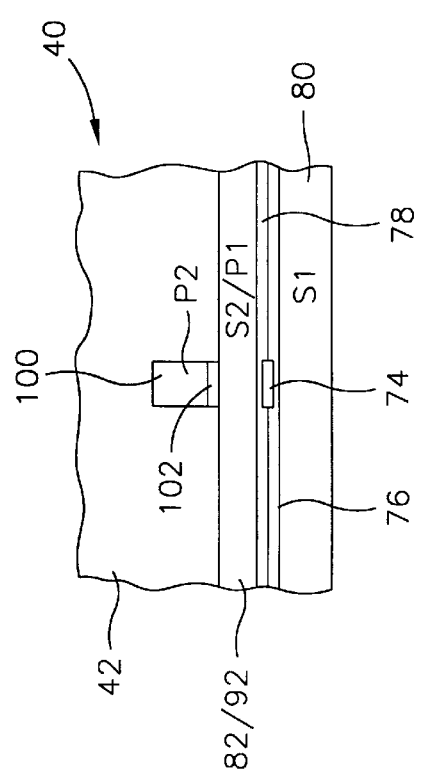
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
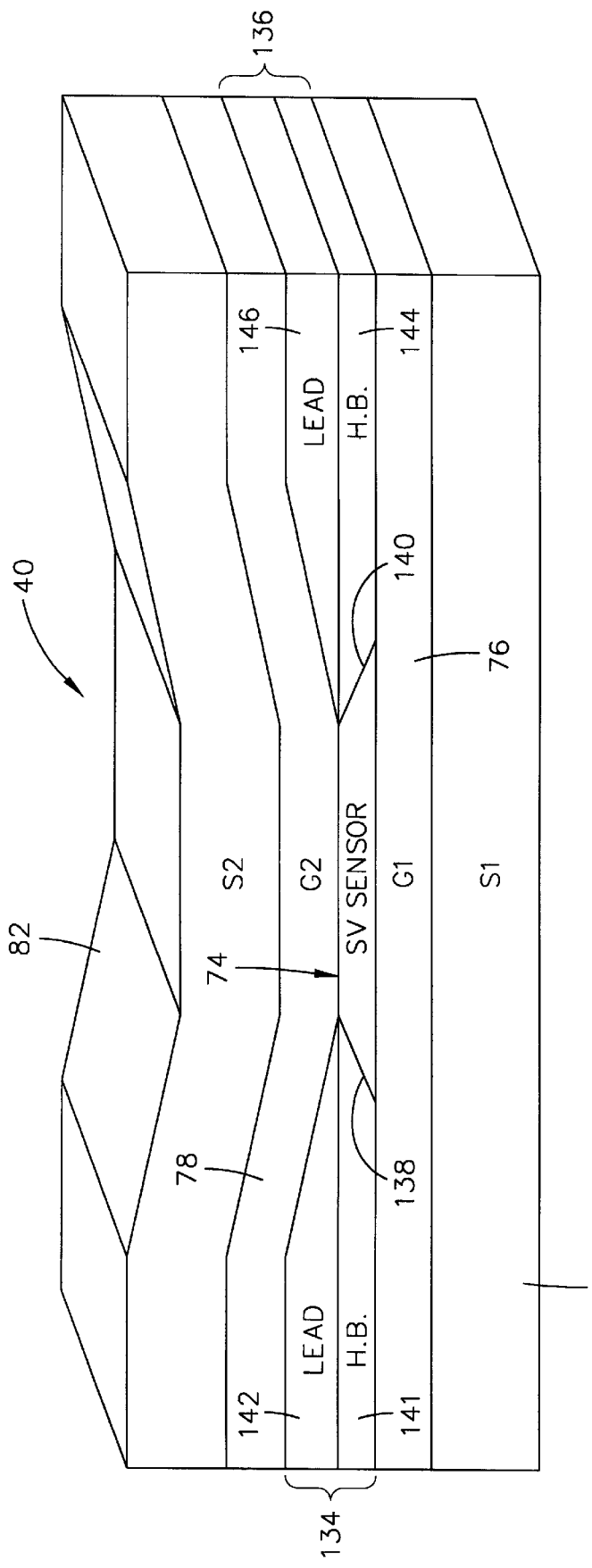
FIG. 11 is an enlarged isometric illustration of the read head with a spin valve sensor.

FIG. 11 is an isometric ABS illustration of the read head 40 shown in FIG. 8 or 9. The read head 40 includes the spin valve sensor 74. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 141 and a first lead layer 142 and the second hard bias and lead layers 136 include a second hard bias layer 144 and a second lead layer 146. The hard bias layers 141 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

Figure 12:
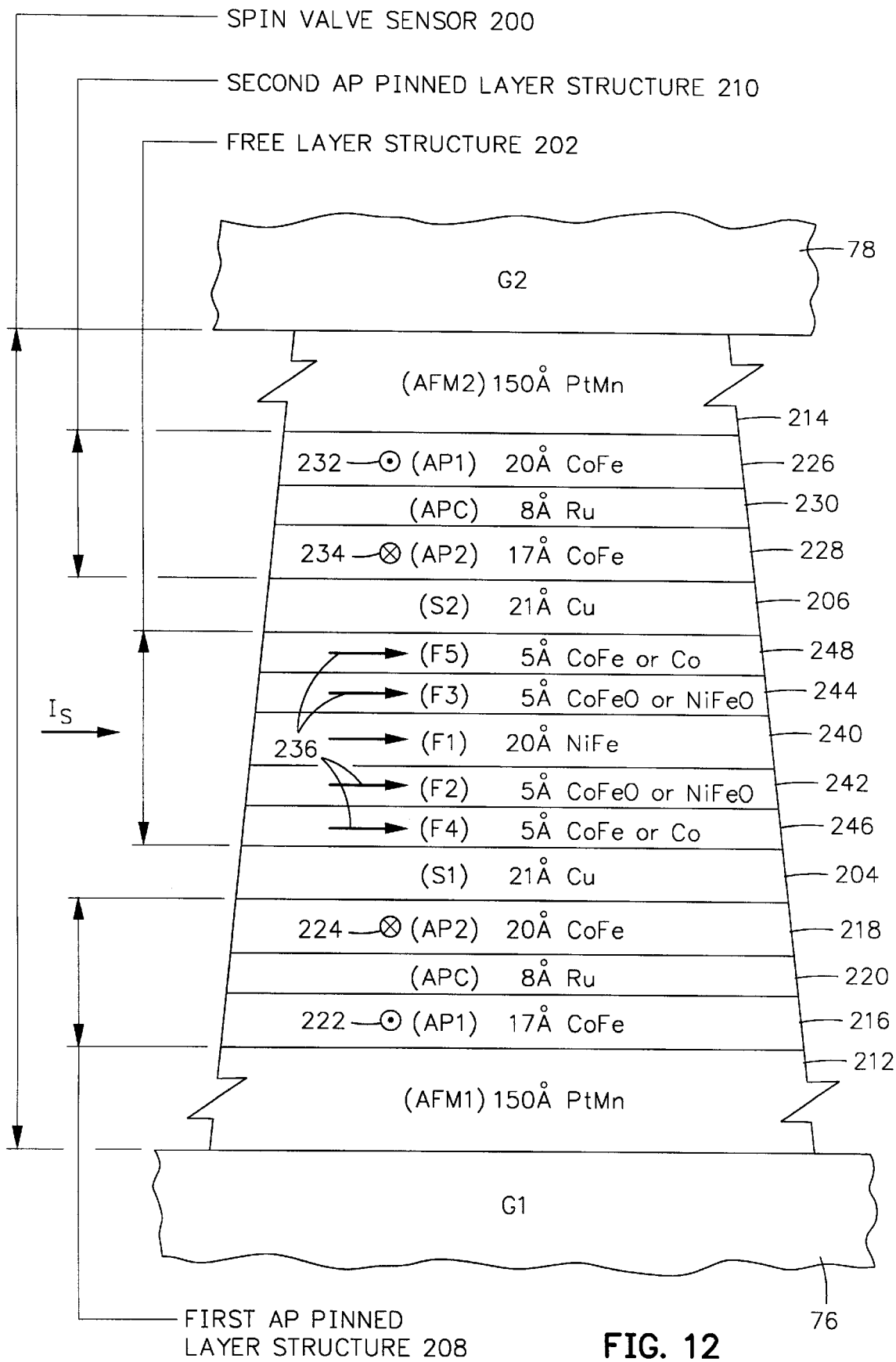
FIG. 12 is an ABS illustration of a first embodiment of the present invention.

A first embodiment of the present invention is shown in the spin valve sensor 200 in FIG. 12. The spin valve sensor 200 includes a free layer structure 202 which is located between nonmagnetic electrically conductive first and second spacer layers (S1) and (S2) 204 and 206. The first and second spacer layers 204 and 206 are located between first and second antiparallel (AP) pinned layer structures 208 and 210 which, in turn, are located between antiferromagnetic first and second pinning layers (AFM1) and (AFM2) 212 and 214.

The first AP pinned layer structure 208 includes ferromagnetic first and second antiparallel layers (AP1) and (AP2) 216 and 218 with an antiparallel coupling layer (APC) 220 located therebetween. The pinning layer 212 pins a magnetic moment 222 of the first AP pinned layer 216 perpendicular to the ABS, such as out of the paper as shown in FIG. 12, which pins the magnetic moment 224 of the second AP pinned layer 218 antiparallel thereto. The second AP pinned layer 210 includes first and second antiparallel layers (AP1) and (AP2) 226 and 228 which are separated by an antiparallel coupling layer (APC) 230. The pinning layer 214 pins a magnetic moment 232 of the first AP pinned layer 226 perpendicular to the ABS and out of the paper and, by a strong antiparallel coupling layer between the first and second AP pinned layers, a magnetic moment 234 of the second AP pinned layer is pinned antiparallel to the magnetic moment 232.

The free layer structure has magnetic moments 236 which are parallel to the ABS and the planes of the layers and may be directed from left to right as shown in FIG. 12. When a signal field rotates the magnetic moments 236 into the sensor the magnetic moments 236 relative to the magnetic moments 224 and 234 become more parallel which reduces the resistance of the spin valve sensor to a sense current field $I_S$ and when a signal field rotates the magnetic moments 236 out of the spin valve sensor the magnetic moments 236 relative to the magnetic moments 224 and 234 become more antiparallel which increases the resistance of the sensor to the sense current $I_S$. These decreases and increases in the resistance of the spin valve sensor to the sense current field Is provide potential changes in the sense current circuit which are processed as playback signals by the processing circuitry 50 in FIG. 3.

The preferred free layer structure 202 includes a first free layer (F1) 240 of nickel iron which is located between and interfaces second and third free layers (F2) and (F3) 242 and 244 of cobalt iron oxide with the second and third free layers 242 and 244 located between fourth and fifth free layers (F4) and (F5) 246 and 248 of cobalt iron or cobalt with the fourth and fifth free layers 246 and 248 interfacing the first and second spacer layers 204 and 206. An exemplary overall thickness of the free layer structure is 40 Å with each of the second, third, fourth and fifth free layers 242, 244, 246 and 248 being 5 Å thick. With this arrangement the thickness of the cobalt iron or cobalt free layers 246 and 248 can be significantly thinner than prior art cobalt iron or cobalt layers next to the first and second spacer layers 204 and 206 while maintaining a desirable magnetoresistive coefficient dr/R and overall softness of the free layer structure 202.

Exemplary thicknesses and materials of the layer are 150 Å of platinum manganese for the first pinning layer 212, 17 Å of cobalt iron for the first AP pinned layer 216, 8 Å of ruthenium for the antiparallel coupling layer 220, 20 Å of cobalt iron for the second AP pinned layer 218, 21 Å of copper for the first spacer layer 204, 5 Å of cobalt iron for the fourth free layer 246, 5 Å of cobalt iron oxide for the second free layer 242, 20 Å of nickel iron for the first free layer 240, 5 Å of cobalt iron oxide for the third free layer 244, 5 Å of cobalt iron for the fifth free layer 248, 21 Å of copper for the second spacer layer 206, 17 Å of cobalt iron for the second AP pinned layer 228, 8 Å of ruthenium for the antiparallel coupling layer 230, 20 Å of cobalt iron for the first AP pinned layer 226 and 150 Å of platinum manganese for the second pinning layer 214.

Figure 13:
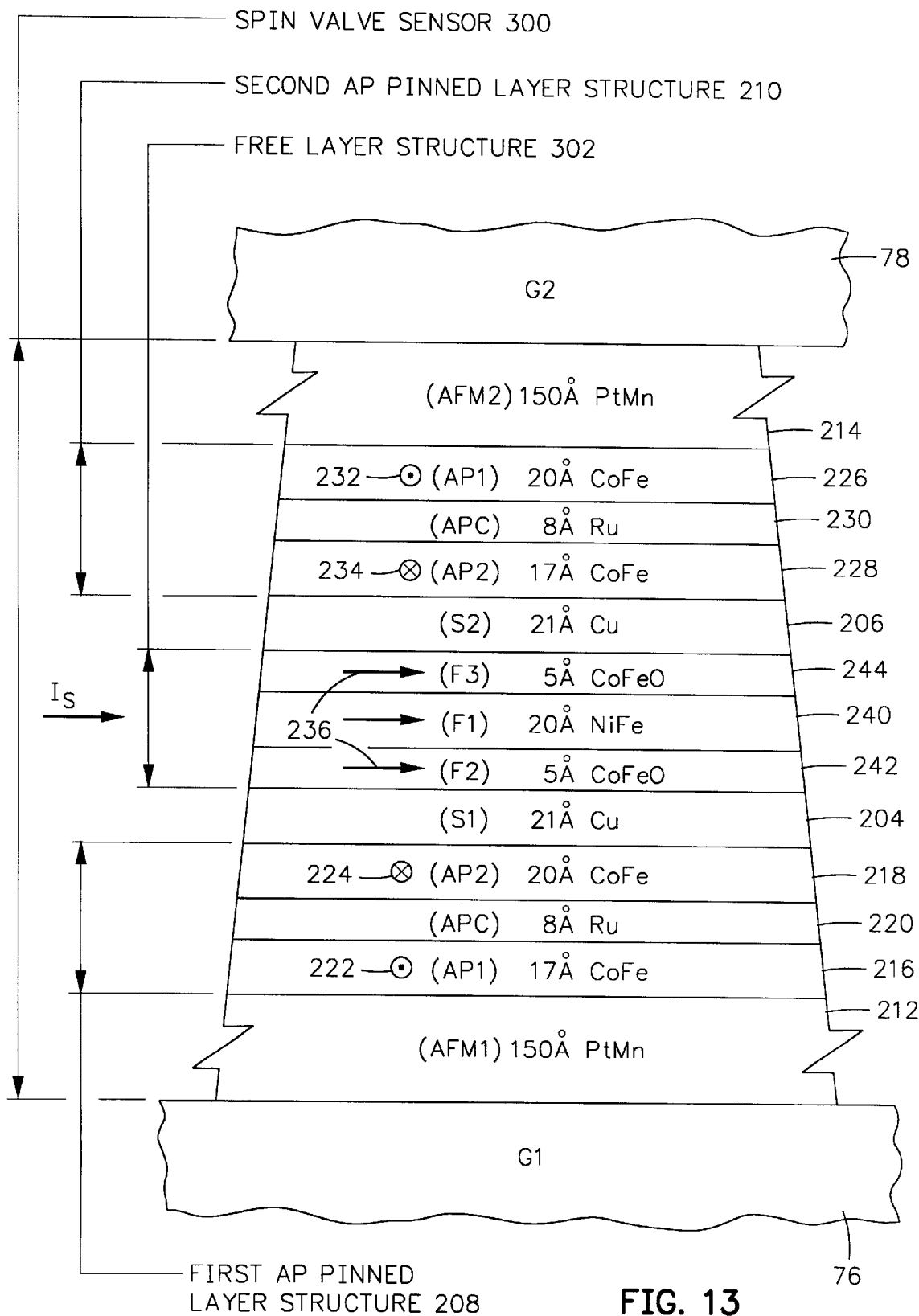
FIG. 13 is an ABS illustration of a second embodiment of the present invention.

A second embodiment of the present invention includes the spin valve sensor 300 shown in FIG. 13. The spin valve sensor 300 is the same as the spin valve sensor 200 shown in FIG. 12 except for a free layer structure 302 and the free layer structure 302 in FIG. 13 is the same as the free layer structure 202 in FIG. 12 except the fourth and fifth free layers 246 and 248 in FIG. 12 have been omitted so that the second and third free layers 242 and 244 in FIG. 13 interface the first and second spacer layers 204 and 206. In the embodiment shown in FIG. 13 the free layer structure is thinner than the free layer structure shown in FIG. 12 which increases the linear bit density of the read head in FIG. 13. Cobalt iron in the second and third free layers 242 and 244 promote the magnetoresistive coefficient dr/R of the read head while maintaining overall softness of the free layer structure 302 so that the read head is more responsive to signal fields. This is accomplished by the specular reflecting capabilities of the second and third free layers 242 and 244.

Figure 14:
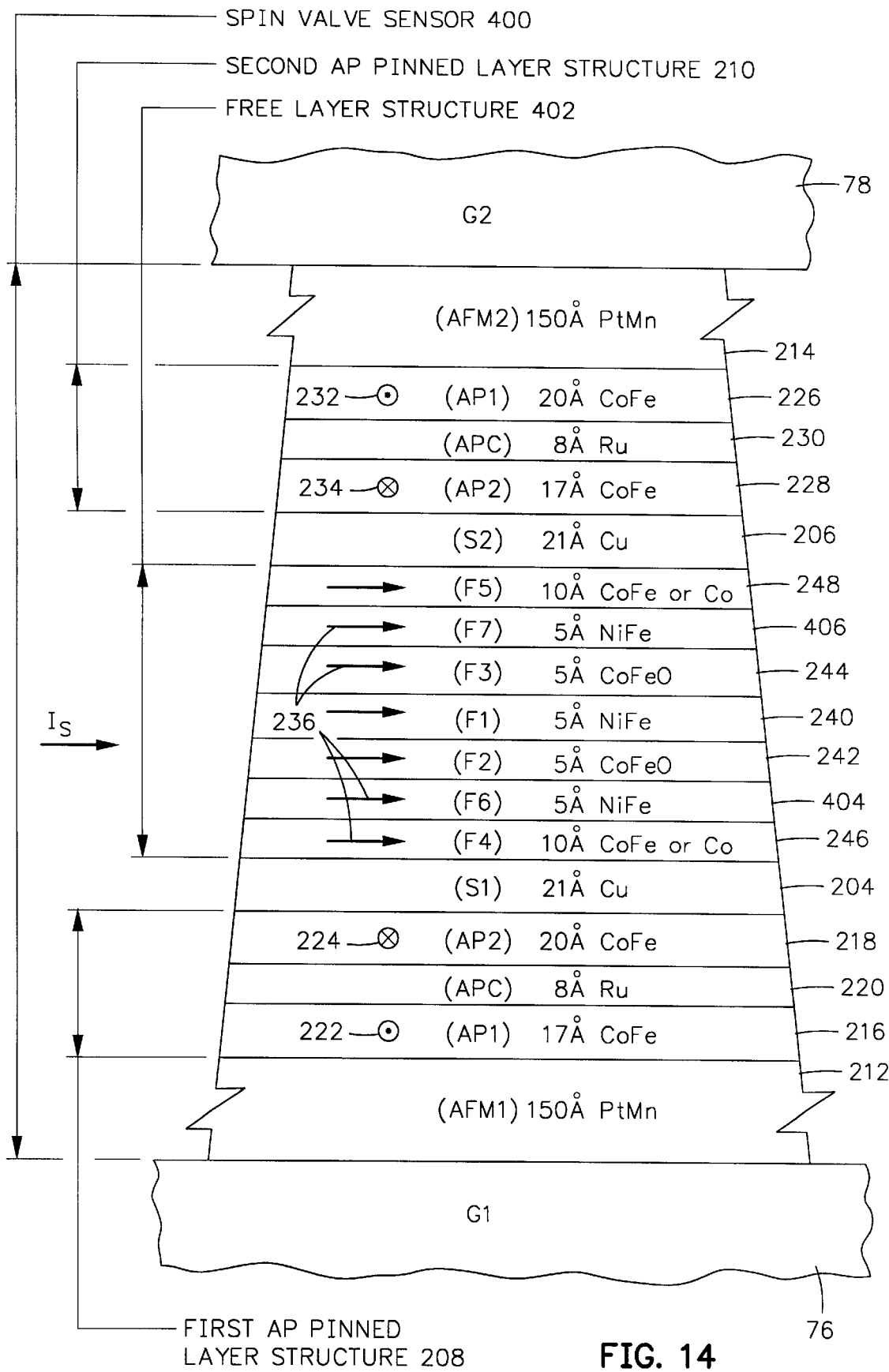
FIG. 14 is an ABS illustration of a third embodiment of the present invention.

The spin valve sensor 400 in FIG. 14 is the same as the spin valve sensor 200 in FIG. 12 except for the free layer structure 402 and the free layer structure 402 is the same as the free layer structure 202 in FIG. 12 except a sixth free layer (F6) 404 is located between and interfaces the fourth and second free layers 246 and 242 and a seventh free layer (F7) 406 is located between and interfaces the fifth and third free layers 248 and 244. Each of the sixth and seventh free layers 404 and 406 are nickel iron and may be 5 Å thick. Another difference is that the first free layer 240 in the free layer structure 402 may be thinner than the first free layer 240 in the free layer structure 202 in FIG. 12, such as 5 Å. This reduced thickness can be provided since the sixth and seventh free layers 404 and 406 provide a nickel iron contribution to the free layer structure. With this arrangement the overall thickness of the free layer structure is 45 Å. In another embodiment the fourth and fifth free layers may be 5 Å instead of 10 Å thick which would reduce the overall thickness to 35 Å. The advantage of placing the sixth and seventh nickel iron free layers 404 and 406 between the cobalt iron or cobalt and cobalt iron oxide layers is to increase the magnetic softness of the fourth and fifth cobalt iron free layers 246 and 248.

Figure 15:
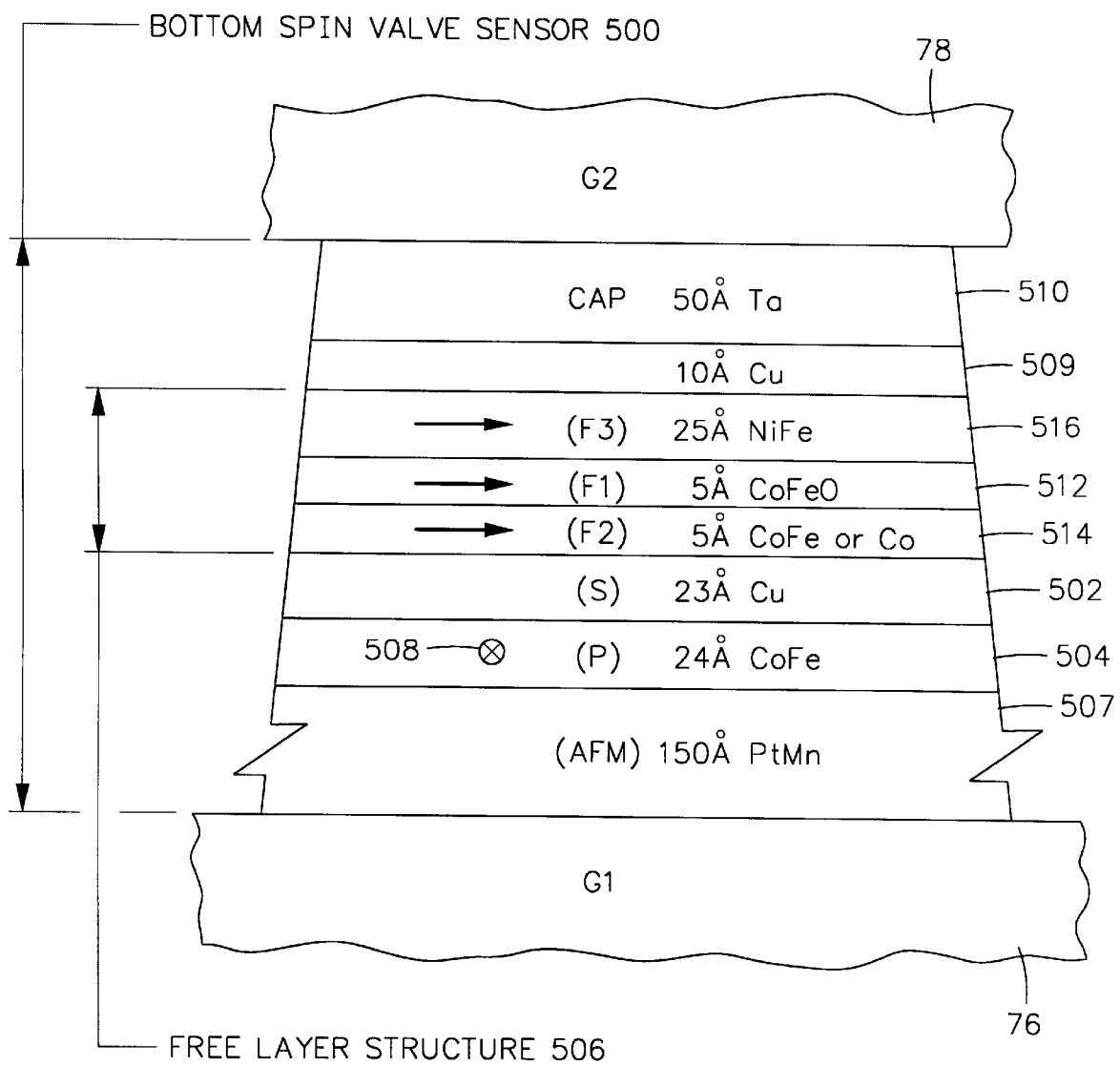
FIG. 15 is an ABS illustration of a fourth embodiment of the present invention.

A fourth embodiment of the present invention is illustrated in the bottom spin valve sensor 500 shown in FIG. 15. The spin valve sensor 500 includes a nonmagnetic electrically conductive spacer layer (S) 502 which is located between a ferromagnetic pinned layer (P) 504 and a ferromagnetic free layer structure 506. A pinning layer 507 interfaces the pinned layer 504 and pins a magnetic moment 508 of the pinned layer perpendicular to the ABS, such as into the spin valve sensor as shown in FIG. 15. The free layer structure 506 is capped by a copper layer 509 and a cap layer 510 which protects the free layer structure.

The free layer structure 506 includes a first free layer (F1) 512 of cobalt iron oxide which is located between and interfaces second and third free layers (F2) and (F3) 514 and 516 of cobalt iron or cobalt and nickel iron respectively. The cobalt iron or cobalt second free layer 514 next to the copper spacer layer 502 promotes the magnetoresistive coefficient dr/R of the spin valve sensor and the cobalt iron oxide first free layer 512 promotes specular reflection which allows the second free layer of cobalt iron 514 to be thinner while maintaining a desirable magnetoresistive coefficient dr/R and softness of the free layer structure 506.

Exemplary thicknesses and materials of the layers are 150 Å of platinum manganese for the pinning layer 507, 24 Å of cobalt iron for the pinned layer 504, 23 Å of copper for the spacer layer 502, 5 Å of cobalt iron for the second free layer 514, 5 Å of cobalt iron oxide for the first free layer 512, 25 Å of nickel iron for the third free layer 516, 10 Å of copper for the layer 509 and 50 Å of tantalum for the cap layer 510.

Figure 16:
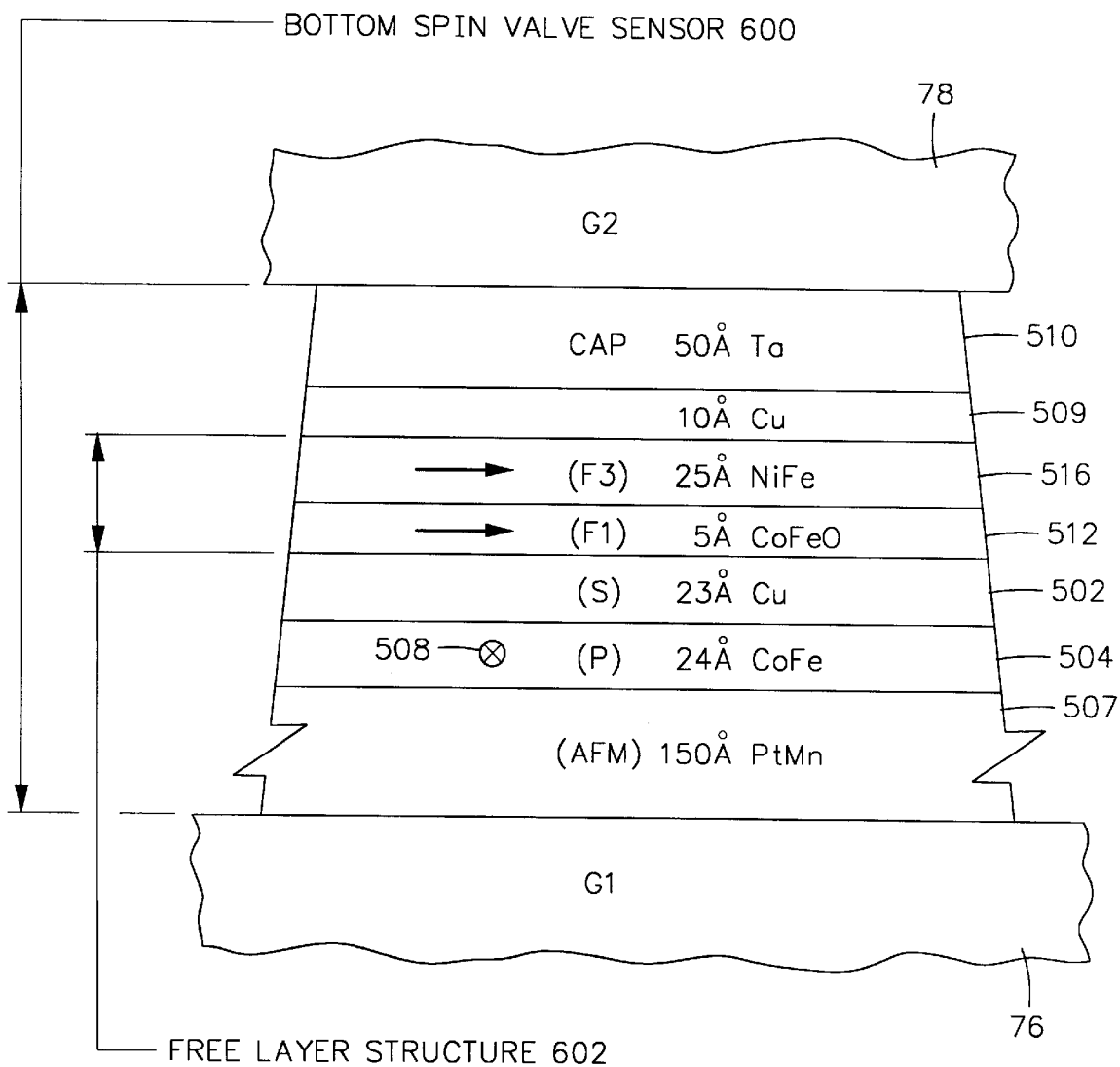
FIG. 16 is an ABS illustration of a fifth embodiment of the present invention.

A fifth embodiment of the present invention is illustrated in the bottom spin valve sensor 600 shown in FIG. 16. The bottom spin valve sensor 600 in FIG. 16 is the same as the bottom spin valve sensor 500 in FIG. 15 except the second free layer 514 in FIG. 15 has been omitted. With this arrangement the first free layer of cobalt iron oxide interfaces the copper spacer layer 502. While the embodiment shown in FIG. 15 is preferred, the embodiment in FIG. 16 has an advantage in that the thickness of the free layer structure 602 can be thinner than the free layer structure 506 so as to increase read head sensitivity.

Figure 17:
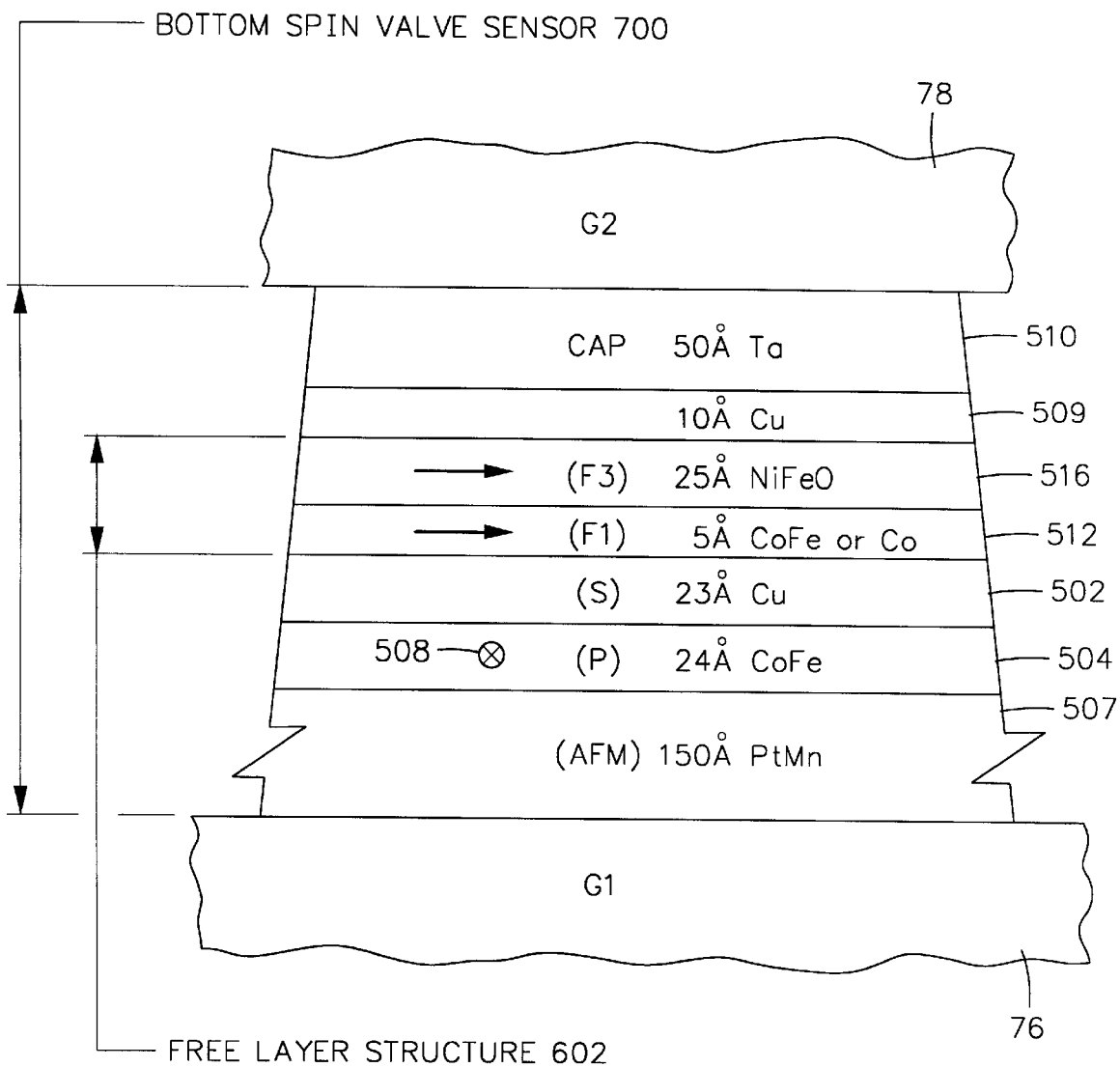
FIG. 17 is an ABS illustration of a sixth embodiment of the present invention.

A sixth embodiment of the invention is shown in the bottom spin valve 700 in FIG. 17. The spin valve 700 is the same as the spin valve sensor 600 in FIG. 16 except the layer 512 in FIG. 17 is 5 Å of cobalt or cobalt iron and the layer 516 is 25 Å of nickel iron oxide. This embodiment has the advantage of maximizing the magnetoresistive coefficient dr/R when a cobalt or cobalt iron layer interfaces the spacer layer 502.

Figure 18:
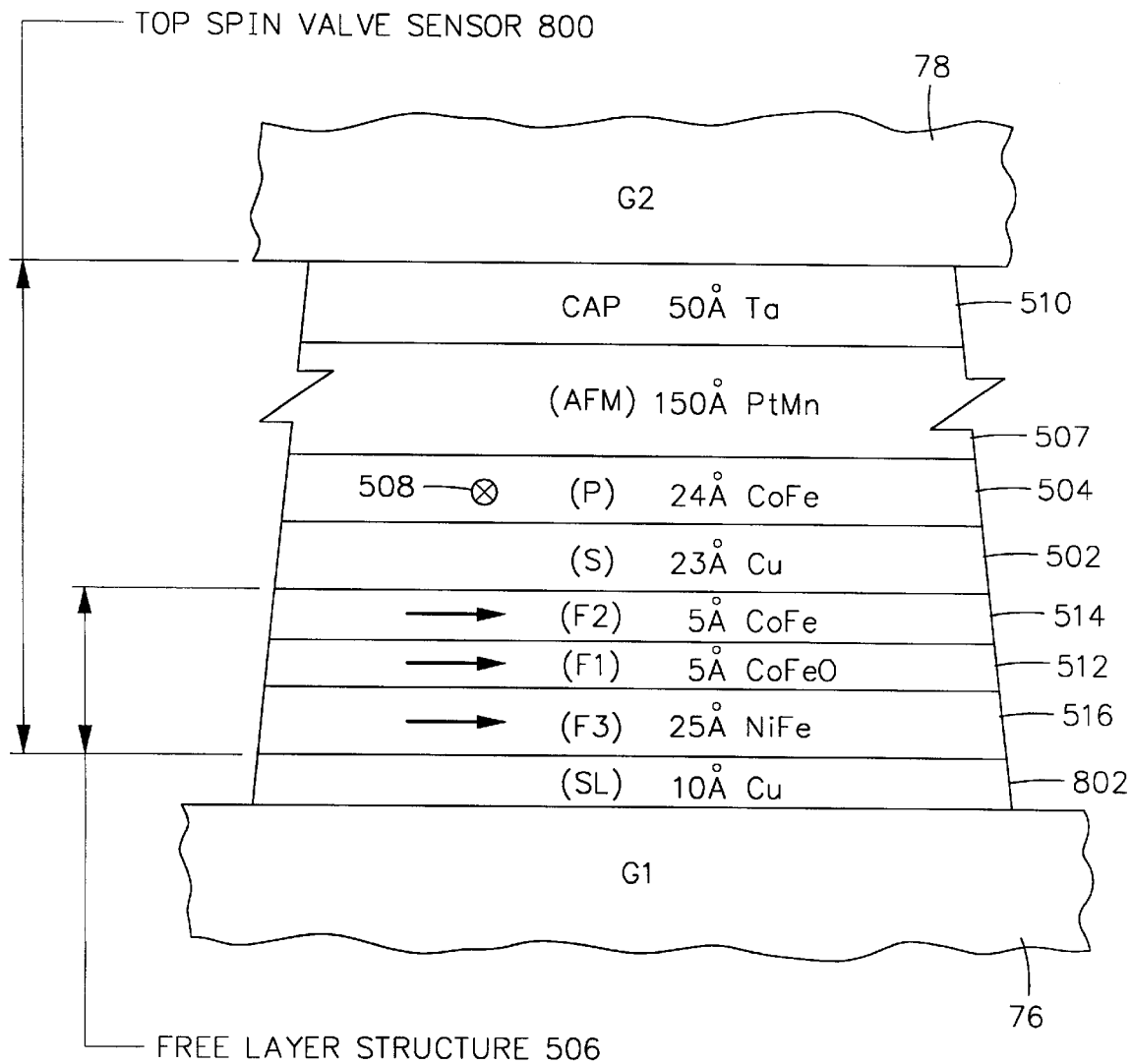
FIG. 18 is an ABS illustration of a seventh embodiment of the present invention.

A seventh embodiment of the present invention is shown in the top spin valve sensor 800 in FIG. 18. The top spin valve sensor 800 in FIG. 18 is the same as the bottom spin valve sensor 500 in FIG. 15 except the layers 508, 504, 502, 514, 512 and 516 have been reversed in their order so that the third free layer 516 is the closest layer to the first read gap layer 76 followed by the first free layer 512, the second free layer 514, the spacer layer 502, the pinned layer 504 and the pinning layer 508. A seed layer (SL) 802 of copper 10 Å thick is preferably located between the gap layer 76 and the third free layer 516.

Figure 19:
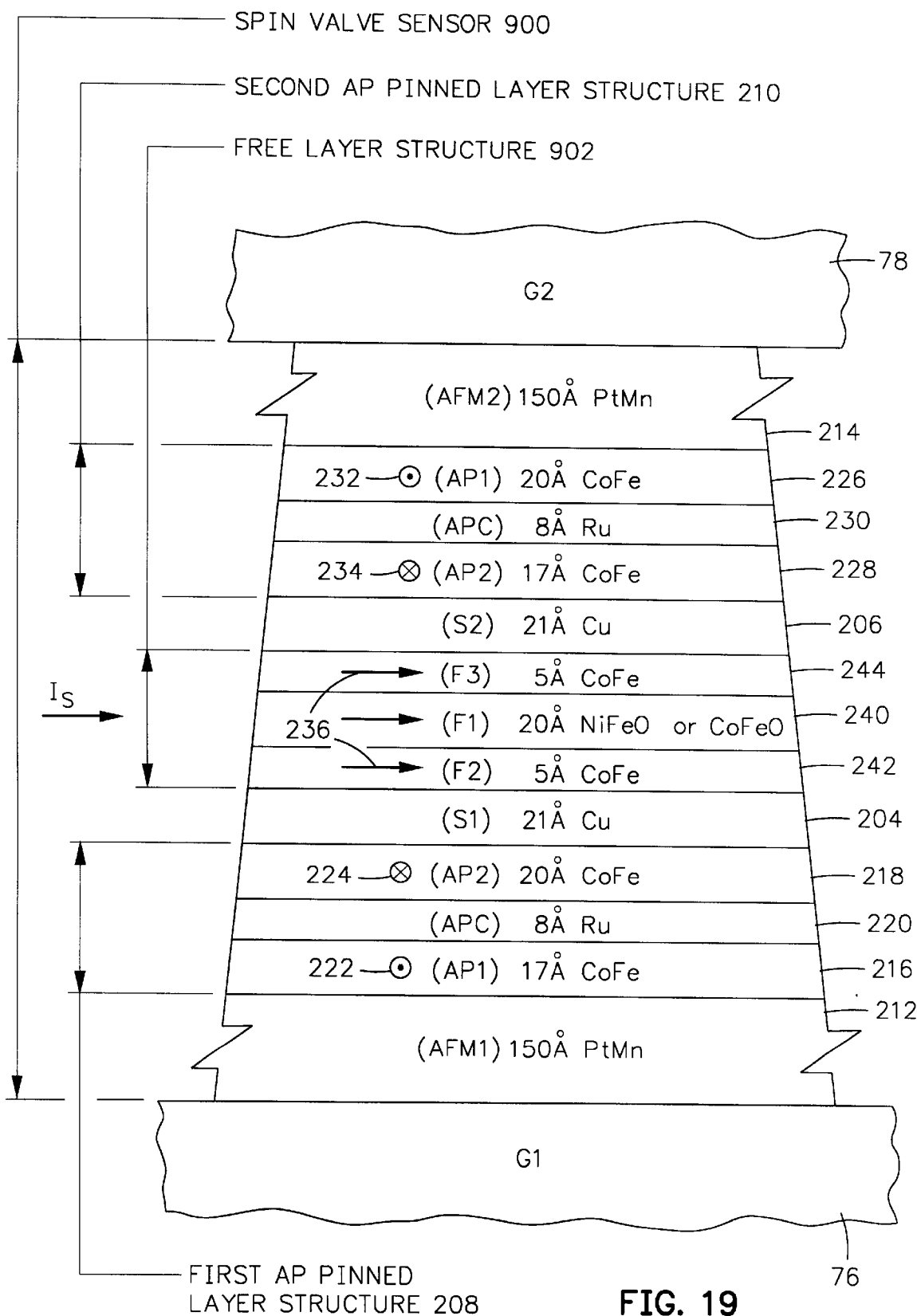
FIG. 19 is an ABS illustration of a eighth embodiment of the present invention.

An eighth embodiment of the invention is shown in the spin valve sensor 900 in FIG. 19. The spin valve sensor 900 is the same as the spin valve sensor 300 in FIG. 13 except the layer 240 is nickel iron oxide and the layers 242 and 244 are cobalt iron oxide. This embodiment has the advantage of optimizing the magnetoresistive coefficient dr/R when cobalt iron layers interface spacer layers 204 and 206.

The invention also includes the method of making each of the embodiments shown in FIGS. 12–17. The ferromagnetic oxide layer may be made by ion beam oxidization, plasma oxidization or in situ natural oxidization. The preferred oxidation is in situ oxidation where after the ferromagnetic material is sputtered onto a substrate in a sputtering chamber oxygen ($O_2$) is introduced into the chamber after cessation of sputtering until the ferromagnetic layer is oxidized.

Discussion

The preferred composition of the materials are $Pt_{50}Mn_{50}$ for the platinum manganese pinning layers, $Ni_{83}Fe_{17}$ for the nickel iron layers, $Co_{90}Fe_{10}$ for the cobalt iron layers, $Co_{90}Fe_{10}O$ for the cobalt iron oxide layers and $Ni_{83}Fe_{17}O$ for the nickel iron oxide layers. It should be understood that cobalt may be substituted for the cobalt iron layers and that other materials may be used for the pinning layers such as nickel manganese or iridium manganese.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:
   a spin valve sensor including:
      a ferromagnetic first pinned layer structure that has a magnetic moment;
      a first pinning layer exchange coupled to the first pinned layer structure for pinning the magnetic moment of the first pinned layer structure;
      a free layer structure;
      a nonmagnetic electrically conductive first spacer layer located between the free layer structure and the first pinned layer structure; and
      the free layer structure including:
         a ferromagnetic layer; and
         a first ferromagnetic oxide layer interfacing the first spacer layer;
   nonmagnetic electrically nonconductive first and second read gap layers;
   the spin valve sensor being located between the first and second read gap layers;
   ferromagnetic first and second shield layers; and
   the first and second read gap layers being located between the first and second shield layers.

2. A magnetic read head as claimed in claim 1 wherein the ferromagnetic layer is NiFe and the first ferromagnetic oxide layer is CoFeO.

3. A magnetic read head which has an air bearing surface (ABS), comprising:
   a spin valve sensor including:
      a ferromagnetic first pinned layer structure that has a magnetic moment;
      a first pinning layer exchange coupled to the first pinned layer structure for pinning the magnetic moment of the first pinned layer structure;
      a free layer structure;
      a nonmagnetic electrically conductive first spacer layer located between the free layer structure and the first pinned layer structure; and
      the free layer structure including:
         a ferromagnetic layer;
         a first ferromagnetic oxide layer;
         the ferromagnetic layer being a nickel iron based layer;
         the first ferromagnetic oxide layer being located between the nickel iron based layer and interfacing the first spacer layer and the nickel iron based layer;
      a ferromagnetic second pinned layer structure that has a magnetic moment;
      a second pinning layer exchange coupled to the second pinned layer structure for pinning the magnetic moment of the second pinned layer;
      a nonmagnetic electrically conductive second spacer layer located between the free layer structure and the second pinned layer structure; and
      the free layer structure further including a second ferromagnetic oxide layer located between and interfacing the second spacer layer and the nickel iron based layer;
   nonmagnetic electrically nonconductive first and second read gap layers;
   the spin valve sensor being located between the first and second read gap layers;
   ferromagnetic first and second shield layers; and
   the first and second read gap layers being located between the first and second shield layers.

4. A magnetic read head as claimed in claim 3 wherein the ferromagnetic layer is NiFe and the first and second ferromagnetic oxide layers are CoFeO.

5. A magnetic head assembly having an air bearing surface (ABS), comprising:
   a write head including:
      ferromagnetic first and second pole piece layers that each have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   a read head including:
      a spin valve sensor;
      nonmagnetic electrically nonconductive first and second read gap layers;
      the spin valve sensor being located between the first and second read gap layers;
      a ferromagnetic first shield layer; and
      the first and second read gap layers being located between the first shield layer and
   the first pole piece layer; and
   the spin valve sensor including:
      a ferromagnetic first pinned layer structure that has a magnetic moment;
      a first pinning layer exchange coupled to the first pinned layer structure for pinning the magnetic moment of the first pinned layer structure;
      a free layer structure;
      a nonmagnetic electrically conductive first spacer layer located between the free layer structure and the first pinned layer structure;
   the free layer structure including:
      a ferromagnetic layer; and
      a first ferromagnetic oxide layer interfacing the first spacer layer.

6. A magnetic head assembly as claimed in claim 5 wherein the ferromagnetic layer is NiFe and the first ferromagnetic oxide layer is CoFeO.

7. A magnetic head assembly having an air bearing surface (ABS), comprising:
   a write head including:
      ferromagnetic first and second pole piece layers that each have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   a read head including:
      a spin valve sensor;
      nonmagnetic electrically nonconductive first and second read gap layers;
      the spin valve sensor being located between the first and second read gap layers;
      a ferromagnetic first shield layer; and
      the first and second read gap layers being located between the first shield layer and the first pole piece layer; and the spin valve sensor including:
- a ferromagnetic first pinned layer structure that has a magnetic moment;
- a first pinning layer exchange coupled to the first pinned layer structure for pinning the magnetic moment of the first pinned layer structure;
- a free layer structure;
- a nonmagnetic electrically conductive first spacer layer located between the free layer structure and the first pinned layer structure;

the free layer structure including:
- a ferromagnetic layer;
- a first ferromagnetic oxide layer;
- the ferromagnetic layer being a nickel iron based layer;
- the first ferromagnetic oxide layer being located between and interfacing the first spacer layer and the nickel iron based layer;
- a ferromagnetic second pinned layer structure that has a magnetic moment;
- a second pinning layer exchange coupled to the second pinned layer structure for pinning the magnetic moment of the second pinned layer;
- a nonmagnetic electrically conductive second spacer layer located between the free layer structure and the second pinned layer structure; and
- the free layer structure further including a second ferromagnetic oxide layer located between and interfacing the second spacer layer and the nickel iron based layer.

8. A magnetic head assembly as claimed in claim 7 wherein the ferromagnetic layer is NiFe and the first and second ferromagnetic oxide layers are CoFeO.

9. A magnetic disk drive including at least one magnetic head assembly that has an air bearing surface (ABS) and that includes a write head and a read head, comprising:

a write head including:
- ferromagnetic first and second pole piece layers that have a yoke portion located between a pole tip portion and a back gap portion;
- a nonmagnetic write gap layer located between the pole tip portions of the first and second pole piece layers;
- an insulation stack with at least one coil layer embedded therein located between the yoke portions of the first and second pole piece layers; and
- the first and second pole piece layers being connected at their back gap portions; and a read head including:
- a spin valve sensor;
- nonmagnetic electrically nonconductive first and second read gap layers;
- the spin valve sensor being located between the first and second read gap layers;
- a ferromagnetic first shield layer; and
- the first and second read gap layers being located between the first shield layer and the first pole piece layer; and the spin valve sensor including:
- a ferromagnetic first pinned layer structure that has a magnetic moment;
- a first pinning layer exchange coupled to the first pinned layer structure for pinning the magnetic moment of the first pinned layer structure;
- a free layer structure;
- a nonmagnetic electrically conductive first spacer layer located between the free layer structure and the first pinned layer structure;

the free layer structure including:
- a nickel iron based layer; and
- a first ferromagnetic oxide layer interfacing the first spacer layer;

a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

10. A magnetic disk drive as claimed in claim 9 wherein the nickel iron based layer is NiFe and the first ferromagnetic oxide layer is CoFeO.

11. A magnetic disk drive including at least one magnetic head assembly that has an air bearing surface (ABS) and that includes a write head and a read head, comprising:

a write head including:
- ferromagnetic first and second pole piece layers that have a yoke portion located between a pole tip portion and a back gap portion;
- a nonmagnetic write gap layer located between the pole tip portions of the first and second pole piece layers;
- an insulation stack with at least one coil layer embedded therein located between the yoke portions of the first and second pole piece layers; and
- the first and second pole piece layers being connected at their back gap portions; and a read head including:
- a spin valve sensor;
- nonmagnetic electrically nonconductive first and second read gap layers;
- the spin valve sensor being located between the first and second read gap layers;
- a ferromagnetic first shield layer; and
- the first and second read gap layers being located between the first shield layer and the first pole piece layer; and the spin valve sensor including:
- a ferromagnetic first pinned layer structure that has a magnetic moment;
- a first pinning layer exchange coupled to the first pinned layer structure for pinning the magnetic moment of the first pinned layer structure;
- a free layer structure;
- a nonmagnetic electrically conductive first spacer layer located between the free layer structure and the first pinned layer structure;

the free layer structure including:
- a nickel iron based layer; and
- a first ferromagnetic oxide layer;
- the first ferromagnetic oxide layer being located between and interfacing the first spacer layer and the nickel iron based layer;
- a ferromagnetic second pinned layer structure that has a magnetic moment;
- second pinning layer exchange coupled to the second pinned layer structure for pinning the magnetic moment of the second pinned layer;

a nonmagnetic electrically conductive second spacer layer located between the free layer structure and the second pinned layer structure; and the free layer structure further including a second ferromagnetic oxide layer located between and interfacing the second spacer layer and the nickel iron based layer;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

12. A magnetic disk drive as claimed in claim 11 wherein the nickel iron based layer is NiFe and the first and second ferromagnetic oxide layers are CoFeO.

13. A method of making a magnetic read head which has an air bearing surface (ABS), comprising the steps of:

a making a spin valve sensor comprising the steps of:

forming a ferromagnetic first pinned layer structure that has a magnetic moment;

forming a first pinning layer exchange coupled to the first pinned layer structure for pinning the magnetic moment of the first pinned layer structure;

forming a free layer structure;

forming a nonmagnetic electrically conductive first spacer layer between the free layer structure and the pinned layer structure;

the making of the free layer structure including the steps of:

forming a ferromagnetic layer; and forming a first ferromagnetic oxide layer interfacing the first spacer layer;

forming nonmagnetic electrically nonconductive first and second read gap layers;

forming the spin valve sensor between the first and second read gap layers;

forming ferromagnetic first and second shield layers; and forming the first and second read gap layers between the first and second shield layers.

14. A method as claimed in claim 13 wherein the ferromagnetic layer is formed of NiFe and the first ferromagnetic oxide layer is formed of CoFeO.

15. A method of making a magnetic read head which has an air bearing surface (ABS), comprising the steps of:

a making a spin valve sensor comprising the steps of:

forming a ferromagnetic first pinned layer structure that has a magnetic moment;

forming a first pinning layer exchange coupled to the first pinned layer structure for pinning the magnetic moment of the first pinned layer structure;

forming a free layer structure;

forming a nonmagnetic electrically conductive first spacer layer between the free layer structure and the pinned layer structure;

the making of the free layer structure including the steps of:

forming a ferromagnetic layer; and forming a first ferromagnetic oxide layer interfacing the first spacer layer;

said forming of the ferromagnetic layer forming a nickel iron based layer;

forming the first ferromagnetic oxide layer between and interfacing the first spacer layer and the nickel iron based layer;

forming a ferromagnetic second pinned layer structure that has a magnetic moment;

forming a second pinning layer exchange coupled to the second pinned layer structure for pinning the magnetic moment of the second pinned layer;

forming a nonmagnetic electrically conductive second spacer layer between the free layer structure and the second pinned layer structure; and the free layer structure being further formed with a second ferromagnetic oxide layer between and interfacing the second spacer layer and the nickel iron based layer;

forming nonmagnetic electrically nonconductive first and second read gap layers;

forming the spin valve sensor between the first and second read gap layers;

forming ferromagnetic first and second shield layers; and forming the first and second read gap layers between the first and second shield layers.

16. A method as claimed in claim 15 wherein the ferromagnetic layer is formed of NiFe and the first and second ferromagnetic oxide layers are formed of CoFeO.

17. A method of making magnetic head assembly that has an air bearing surface (ABS), comprising the steps of:

making a write head including the steps of:

forming ferromagnetic first and second pole piece layers in pole tip, yoke and back gap regions wherein the yoke region is located between the pole tip and back gap regions;

forming a nonmagnetic write gap layer between the first and second pole piece layers in the pole tip region;

forming an insulation stack with at least one coil layer embedded therein between the first and second pole piece layers in the yoke region; and connecting the first and pole piece layers at said back gap region; and making a read head including the steps of:

forming nonmagnetic nonconductive first and second read gap layers;

forming a spin valve sensor between the first and second read gap layers;

forming the first and second read gap layers between the first shield layer and the first pole piece layer; and a making of the spin valve sensor comprising the steps of:

forming a ferromagnetic first pinned layer structure that has a magnetic moment;

forming a first pinning layer exchange coupled to the first pinned layer structure for pinning the magnetic moment of the first pinned layer structure;

forming a free layer structure;

forming a nonmagnetic electrically conductive spacer layer between the free layer structure and the pinned layer structure;

the making of the free layer structure including the steps of:

forming a nickel iron based layer; and forming a first ferromagnetic oxide layer interfacing the first spacer layer.

18. A method as claimed in claim 17 wherein the nickel iron based layer is formed of NiFe and the first ferromagnetic oxide layer is formed of CoFeO.

19. A method of making magnetic head assembly that has an air bearing surface (ABS), comprising the steps of:

making a write head including the steps of:

forming ferromagnetic first and second pole piece layers in pole tip, yoke and back gap regions wherein the yoke region is located between the pole tip and back gap regions;

forming a nonmagnetic write gap layer between the first and second pole piece layers in the pole tip region;

forming an insulation stack with at least one coil layer embedded therein between the first and second pole piece layers in the yoke region; and connecting the first and pole piece layers at said back gap region; and making a read head including the steps of:

forming nonmagnetic nonconductive first and second read gap layers;

forming a spin valve sensor between the first and second read gap layers;

forming the first and second read gap layers between the first shield layer and the first pole piece layer; and a making of the spin valve sensor comprising the steps of:

forming a ferromagnetic first pinned layer structure that has a magnetic moment;

forming a first pinning layer exchange coupled to the first pinned layer structure for pinning the magnetic moment of the first pinned layer structure;

forming a free layer structure;

forming a nonmagnetic electrically conductive spacer layer between the free layer structure and the pinned layer structure;

the making of the free layer structure including the steps of:

forming a nickel iron based layer; and forming a first ferromagnetic oxide layer;

forming the first ferromagnetic oxide layer between and interfacing the first spacer layer and the nickel iron based layer;

forming a ferromagnetic second pinned layer structure that has a magnetic moment;

forming a second pinning layer exchange coupled to the second pinned layer structure for pinning the magnetic moment of the second pinned layer;

forming a nonmagnetic electrically conductive second spacer layer between the free layer structure and the second pinned layer structure; and the free layer structure being further formed with a second ferromagnetic oxide layer between and interfacing the second spacer layer and the nickel iron based layer.

20. A method as claimed in claim 19 wherein the nickel iron based layer is formed of NiFe and the first and second ferromagnetic oxide layers are formed of CoFeO.

* * * * *